United States Patent [19]

Will

[11] 4,058,651

[45] Nov. 15, 1977

[54] RECHARGEABLE AQUEOUS METAL-HALOGEN CELL

[75] Inventor: Fritz G. Will, Scotia, N.Y.

[73] Assignee: General Electric Company, Schenectady, N.Y.

[21] Appl. No.: 729,003

[22] Filed: Oct. 4, 1976

[51] Int. Cl.² .......................................... H01M 10/36
[52] U.S. Cl. ................................... 429/105; 429/199
[58] Field of Search .............. 429/105, 194, 198, 199, 429/201, 206, 218, 229, 188

[56] References Cited

U.S. PATENT DOCUMENTS

| | | | |
|---|---|---|---|
| 3,285,781 | 11/1966 | Zito, Jr. ............................ | 429/199 X |
| 3,573,105 | 3/1971 | Weininger et al. .................. | 429/105 |
| 3,653,965 | 4/1972 | Lee .................................. | 429/206 X |
| 3,816,177 | 6/1974 | Walsh ................................ | 429/194 |
| 3,929,506 | 12/1975 | Leddy et al. ........................ | 429/199 |

*Primary Examiner*—Anthony Skapars
*Attorney, Agent, or Firm*—Paul R. Webb, II; Joseph T. Cohen; Jerome C. Squillaro

[57] ABSTRACT

A rechargeable aqueous metal-halogen cell is described which includes a casing, a pair of spaced apart porous electrode substrates in the casing, a fine-porous separator between the electrode substrates defining a positive and a negative electrode compartment, an electrolytic solution containing a zinc salt selected from the class consisting of zinc bromide, zinc iodide, and mixtures thereof in both compartments, and an organic halogen complexing additive in the electrolytic solution of at least the positive compartment.

6 Claims, 4 Drawing Figures

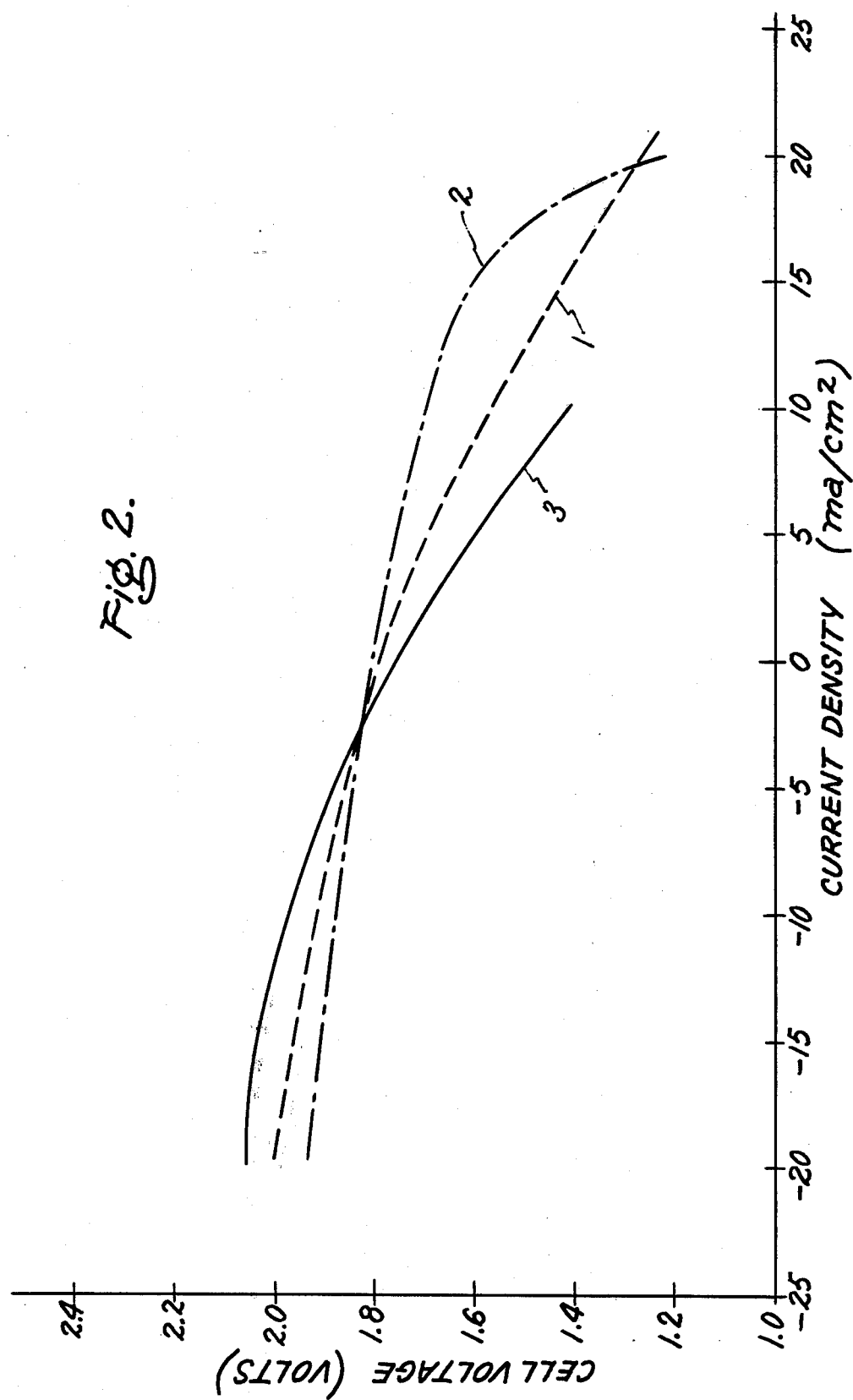

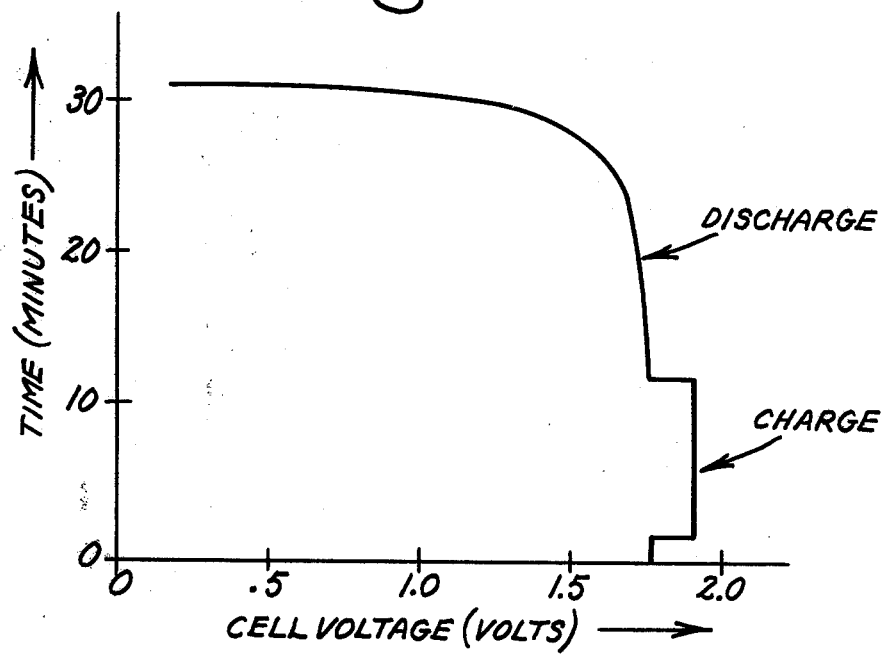
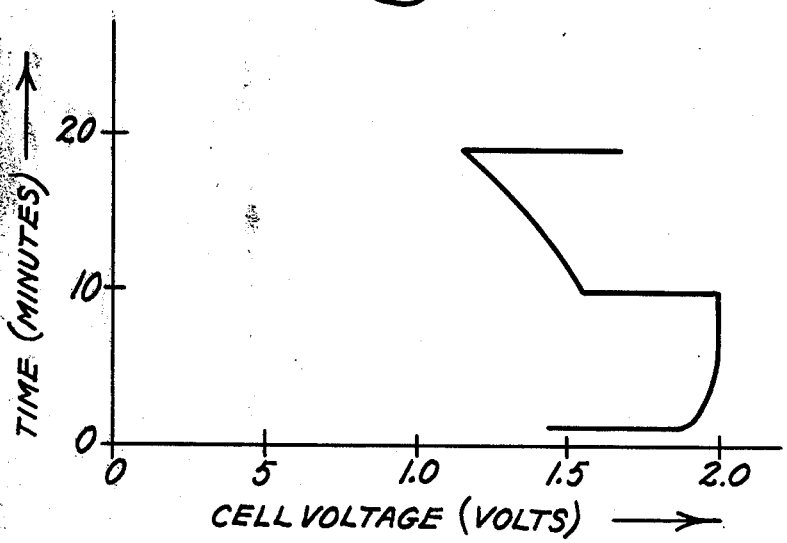

RECHARGEABLE AQUEOUS METAL-HALOGEN CELL

This invention relates to electrochemical cells and more particularly, to rechargeable aqueous metal-halogen cells.

Metal-halogen cells while disclosed in the patent literature prior to the turn of the century, have to this day, presented a number of well recognized disadvantages. A particular disadvantage of halogen electrodes is that while halogens must be dissolved to be utilized, such dissolved halogens will diffuse to the negative electrode and chemically react to self-discharge the cell. One approach to control halogen diffusion has been to interpose an ionically permeable diffusion barrier for unreacted halogen between the positive electrode and the negative electrode. Another approach has been to reduce halogen solubility and diffusion by complexing the halogen with specific organic additives. A particular disadvantage of the zinc electrode is the formation of needle-like zinc dendrites during cell charging which often lead to electrical cell shorting. An approach to reduce this problem has been to add organic compounds to inhibit dendrite growth.

In U.S. Pat. No. 3,573,105 entitled "Rechargeable Non-Aqueous Alkali Metal-Halogen Electrochemical Cells", there is described a rechargeable non-aqueous, as opposed to aqueous in the present invention, alkali metal-halogen electrochemical cell which includes an alkali metal anode, a halogen cathode, a non-aqueous electrolyte, and an ion-permeable barrier to inhibit migration of halogen to the negative electrode between the electrodes.

In U.S. Pat. No. 3,816,177 entitled "Secondary Cells and Batteries", there is described a cell using an organic halogen complex, including a zinc anode, an aqueous zinc-containing acidic electrolyte, a quarternary ammonium halide and an organic complexing additive, such as propylene carbonate, in the electrolyte. The ammonium halide and additive are contained in a single electrolyte within the cell.

In U.S. Pat. No. 3,653,965, entitled "Rechargeable Galvanic Cell and Electrolyte Therefor", there is described a cell including a zinc anode, an aqueous zinc-containing alkaline or acidic electrolyte, and ethylene oxide polymers or their derivatives for suppressing dendrite formation during the charging cycle.

The present invention is directed to a rechargeable aqueous metal-halogen cell including a pair of porous electrode substrates, a fine-porous separator therebetween, and a novel organic halogen complexing additive in the electrolytic solution in the positive compartment. The organic additive forms an organic complex with the halogen which exhibits low water solubility and low halogen vapor pressure and can be charged and discharged reversibly on the positive electrode.

It is an object of my invention to provide a rechargeable aqueous metal-halogen cell which does not rapidly self discharge.

In accordance with one aspect of my invention, a rechargeable aqueous metal-halogen cells employs a casing, a pair of porous electrode substrates in the casing, a fineporous separator between the electrodes defining a positive and a negative electrode compartment, an electrolytic solution containing a zinc salt selected from the class consisting of zinc bromide, zinc iodide, and mixtures thereof in both compartments, and an organic halogen complexing additive in the electrolytic solution in the positive compartment.

These and various other objects, features, and advantages of the invention will be better understood from the following description taken in connection with the accompanying drawing in which:

FIG. 2 is a graph disclosing polarization curves on charge and discharge of three cells made in accordance with my invention in which cell voltage in volts is plotted against current density in milliamperes per centimeter square;

FIG. 3 is a graph showing charge and discharge behavior of a cell in which cell voltage in volts is plotted against time in minutes; and FIG. 4 is a graph showing charge and discharge behavior of another cell in which cell voltage in volts is plotted against time in minutes.

Figure 1:
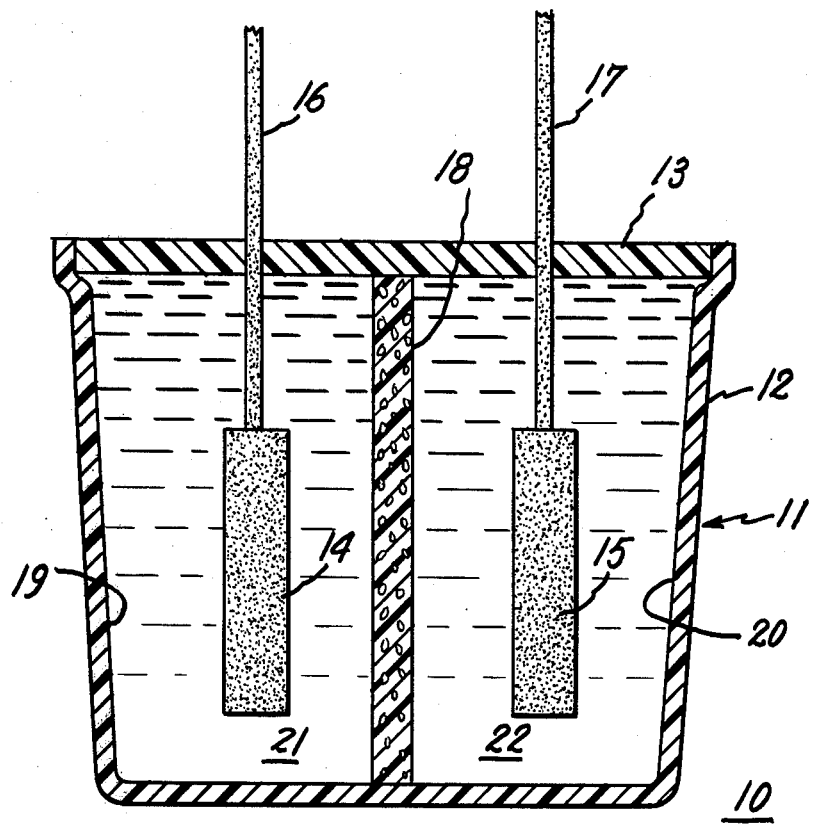
FIG. 1 is a sectional view of a rechargeable aqueous metal-halogen cell made in accordance with my invention.

In FIG. 1 of the drawing, there is shown generally at 10 a rechargeable aqueous metal-halogen cell embodying my invention. Such a cell, which is portable or stationary, contains a stationary electrolyte as opposed to a flowing electrolyte. Cell 10 has a casing 11 which includes a body portion 12 and a cover 13. While casing 11 is shown as a polyolefin plastic or polytetrafluoroethylene, other plastic materials can be employed. The casing can also be made of glasses, or metals which include an inner liner of a polyolefin plastic. Unlined metals, such as tantalum, niobium and molybdenum can also be employed for the casing.

A pair of porous carbon electrode substrates 14 and 15 are suspended within casing 11 by carbon rods 16 and 17, respectively. Electrical leads (not shown) are connected to rods 16 and 17 and to a power source (not shown) or to an apparatus (not shown). A fine-porous separator 18, such as porous polyethylene or polypropylene, defines a positive compartment 19 containing electrode 14 and a negative compartment 20 containing electrode 15. The positive compartment 19 is the compartment which will contain bromine during the charging cycle of the cell while the negative compartment 20 is the compartment in which zinc is deposited upon its electrode 15. In the positive compartment, the porous substrate can also be made of porous metal of tantalum, niobium, molybdenum or platinum in various forms, such as screens or foams. In the negative compartment, porous substrate 15 can also be made of porous metal of copper, tin or lead in various forms, such as screens or foams.

An aqueous acidic electrolytic solution, containing zinc bromide and an organic halogen complexing additive of ethylene glycol, is shown as 21 in positive compartment 19. A similar aqueous acidic electrolytic solution containing zinc bromide but no organic halogen additive is shown as 22 in negative compartment 20. While it is only necessary and thus preferred to add the organic halogen complexing additive to the electrolytic solution in the positive compartment, it can be added to both compartments. While zinc bromide is described above for the electrolytic solution, the zinc-containing ion for the electrolyte can be selected from a zinc salt of zinc bromide, zinc iodide or mixtures thereof. The electrolytic solution will of course contain water but it may also contain one or more other salts such as potassium bromide, sodium bromide, calcium bromide or calcium chloride. I found that a preferred electrolytic solution contained, on a weight basis, 54% $H_2O$, 12% $ZnBr_2$, 12% KBr, 12% $CaCl_2$ and 10% organic halogen complex additive.

In above-mentioned U.S. Pat. No. 3,653,965, ethylene oxide polymers are added to an aqueous electrolyte, for example, sodium or potassium hydroxide or zinc chloride, which cell requires a zinc electrode and a specific active material containing positive electrode, such as nickel hydroxide, to provide energy. The ethylene oxide polymers are added to suppress zinc dendrite formation during the charging cycle. As opposed to this patent, my invention is not concerned with zinc dendrite suppression but with the complexing of bromine and iodine with an organic complexing additive, in particular, ethylene oxide polymers and their ether and ester derivatives to prevent excessive self discharge of the cell. In fact, I found that zinc chloride will not function according to the aims of my invention. During charging of a cell containing zinc chloride, but no iodides or bromides, the chlorine will not complex with the additive of my invention. I found that only zinc bromide, zinc iodide or mixtures thereof will work in my cell. Furthermore, my cell requires only inert electrode substrates as opposed to the specific requirement in U.S. Pat. No. 3,653,965 for both a zinc electrode and a specific active material containing positive electrode. Without such a specific positive electrode, the cell of this patent will not produce energy therefrom.

I found that I could complex only the halogen bromine and iodine or mixtures thereof with a particular class of organic halogen complexing additives in the electrode compartments of a metal-halogen aqueous cell to provide a novel secondary battery. However, it is only required to complex the halogen in the positive compartment. Thus, I prefer to add the organic halogen complexing additive only to the positive electrode. These additives appear to be chemically and thermally more stable and, in addition, less expensive than the above-described halogen complex with a quarternary ammonium halide and an organic complexing additive, such as propylene carbonate.

The organic halogen complexing additives of the present invention are selected from the class consisting of ehtylene glycol, diethylene glycol, triethylene glycol, propylene glycol, polyethylene glycols having a molecular weight from about 200 to 6000, and their alkyl ethers are alkyl esters, the alkyl having from one to four carbon atoms, polypropylene glycols having a molecular weight from about 200 to 6000, and their alkyl ethers or alkyl esters, the alkyl having from one to four carbon atoms. The complexes formed between these additives and bromine or iodine or mixtures thereof, have much lower vapor pressure than elemental bromine or iodine and have very low solubility in electrolytic solutions containing zinc bromide, zinc iodide or mixtures thereof. These complexes can be revesibly charged and discharged in an aqueous metal-halogen cell. The lower molecular weight glycols are oily liquids, the higher ones are waxy solids. Formation of the halogen complexes is readily accomplished by reacting the glycol directly with the halogen. The reaction is exothermic and results in complexes with their physical state varying from light-oil consistency to that of a stiff paste, depending on the molecular weight of the glycol used. Chemical analysis shows that the glycols become partially halogenated and it is likely that excess halogen associates with the C-Br group to form a polyhalide complex, for example, $C-Br_3$, $C-Br_5$, $C-Br_7$, depending on the amount of excess halogen available.

The activity of elemental bromine is greatly reduced by complex formation with glycols. This results in three major advantages: (1) The vapor pressure of bromine is lowered by almost two orders of magnitude, (2) the stability of the complex at elevated temperatures is increased, and (3) the corrosiveness of bromine is greatly reduced, making possible the use of metals and plastics that cannot be used in contact with elemental bromine. The sacrifice in cell voltage, accompanying the lower bromine activity is but small: an order of magnitude decrease in activity lowers the cell voltage by only 30 millivolts. The solubility of bromine-glycol complexes in aqueous zinc bromide solutions, which is desired to be as small as possible, lies between a fraction of one percent and several percent, with the lower solubilities applying to the higher molecular weight polyethylene glycols.

In a zinc-bromine cell, bromide salts are required in an aqueous solution to provide sufficient $Br_2$ solubility by the formation of $Br_3^-$-ions. However, without sufficient $Br_2$ solubility in the aqueous solution, the cell does not function properly. An expensive separator between the electrodes in the cell is required to prevent the diffusion of the $Br_3^-$-ions to the negative zinc electrode and subsequent chemical reaction to form zinc bromide. No electrical energy is produced in this process, resulting in useless self discharge of the cell. As opposed to these previous zinc-bromine cells, the cell of the present invention can employ an inexpensive porous separator in addition to the organic halogen complexing additive.

With the addition of one of the above organic halogen complexing compounds of my invention to the electrolytic solution in both compartments and preferably to the positive compartment of the cell, the solubility of the $Br_3^-$-ion in the aqueous electrolyte is reduced sharply upon cell charging because of the complexing of the halogen with the additive. Nevertheless, the cell functions well as long as the halogen complex is in contact with the positive electrode. The additive is preferably employed in an amount from 10 to 50 weight percent of the electrolytic solution. Upon charging of the cell, bromine is evolved, reacts at the positive electrode substrate to form an organic halogen complex electrode which ties up the bromine. In the negative compartment, zinc is deposited on the negative electrode substrate to provide a zinc electrode. The complex of the halogen with the additive is not formed until the cell is charged. Instead of an expensive ion exchange membrane, an inexpensive porous separator can be employed between the electrodes. Upon cell discharge the complex of the halogen with the additive reacts at the positive electrode and the original organic additive is formed.

Examples of rechargeable aqueous metal-halogen cells made in accordance with my invention are set forth below:

EXAMPLE I

A glass cell was assembled including a glass casing and a glass cover. A pair of porous carbon electrode substrates connected by carbon rods were inserted into thee casing portion and spaced apart. A microporous polypropylene separator of 0.001 inch thickness was inserted into the casing between the electrodes to define a positive compartment and a negative compartment. The positive compartment was filled with an aqueous acidic electrolytic solution containing 54% $H_2O$, 12% $ZnBr_2$, 12% KBr, 12% $CaCl_2$ and 10% ethylene glycol by weight. The negative compartment was filled with an aqueous electrolytic solution containing 64% $H_2O$, 12% $ZnBr_2$, 12% KBr and 12% $CaCl_2$ by weight. No organic halogen complex additive was added to the electrolytic solution in the negative compartment. This cell was made in accordance with my invention.

EXAMPLE II

The cell of Example I was charged with a current of 100 ma, corresponding to a current density of 20 ma/cm$^2$ for three minutes. Bromine was formed on the positive carbon electrode and zinc was deposited onto the negative electrode.

The polarization curve on charge and discharge was then determined as shown in FIG. 2 as curve 1.

The rate of self discharge was determined by charging the cell with a known amount of ampere-minutes, keeping the cell on open circuit for periods of time ranging from five minutes to several hours and then discharging the cell. The rate of self discharge was found to be less than 0.1 ma/cm$^2$, which is two orders of magnitude lower than without the use of the bromine complex.

EXAMPLE III

An identical cell was used as in Example I, but 10 percent polyethylene glycol with molecular weight of 200 was added to the electrolytic solution in the positive compartment of the cell instead of ethylene glycol. The polarization curve of this cell is shown in FIG. 2 as curve 2 while FIG. 3 shows curves for short-term charging with 200 ma and discharging with 100 ma. The fast decay of the cell voltage after 10 minutes is due to the exhaustion of the very small amount of bromine produced during charging. The favorable voltages during charge and discharge, namely, 2.15 volts (at 200 ma/cm$^2$) and 1.6 volts (at 100 ma/cm$^2$) reflect the low cell resistance of 1.8 Ω that can be achieved with this type of cell which employs a porous separator of only 0.001 inch thickness. Despite the use of such a thin separator, the rate of self discharge was only 0.1 ma/cm$^2$.

EXAMPLE IV

An identical cell was used as in Example I and II except that 10 percent polyethylene glycol with a molecular weight of 1000 was added to the aqueous electrolyte instead of the additive in Example II and III. The polarizatiion curve for this cell is again shown in FIG. 2 as curve 3. The charge and discharge behavior was similar to that shown in FIG. 3.

EXAMPLE V

Another cell was assembled consisted of a glass beaker with a horizontal platinum screen at the bottom, a copper screen on top of the platinum screen at a distance of 1 mm and macroporous non-woven polypropylene spacer of 0.25 mm thickness separating the two electrode substrates. The cell was filled with a solution containing 36% $H_2O$, 22% $ZnBr_2$, 11% KBr, 11% $CaCl_2$ and 20% polyethylene glycol of molecular weight 1500. The cell was charged with 300 ma for 10 minutes by connecting the platinum screen to the positive pole and the copper screen to the negative pole of a power supply. The cell was then charge/discharge cycled with 50 ma. A typical curve on charge and discharge is shown in FIG. 4. In this example, the organic halogen complexing additive was in both the positive and the negative compartment.

In all of the above examples of using various bromineglycol complexes, it was found that the rate of self discharge was orders of magnitude lower than in the case of using elemental bromine thus enabling the use of simple, inexpensive battery separators.

While other modifications of the invention and variations thereof which may be employed within the scope of the invention have not been described, the invention is intended to include such as may be embraced with the following claims:

What I claim as new and desire to secure by Letters Patent of the United States is:

1. A rechargeable aqueous metal-halogen cell comprising a casing, a pair of spaced apart porous electrode substrates in the casing, a fine-porous separator between the electrode substrates defining a positive and a negative electrode compartment, an electrolytic solution containing a zinc salt selected from the class consisting of zinc bromide, zinc iodide and mixtures thereof in both compartments, and an organic halogen complexing additive in the electrolytic solution of at least the positive compartment, the additive present in an amount from 10 to 50 weight percent of the electrolytic solution, the organic halogen complex additive selected from the class consisting of ethylene glycol, diethylene glycol, triethylene glycol, propylene glycol, polyethylene glycols having a molecular weight from about 200 to 6000, alkyl ethers and alkyl esters thereof, the alkyl having from one to four carbon atoms, and polypropylene glycol having a molecular weight from about 200 to 6000, alkyl ethers and alkyl esters thereof, the alkyl having from one to four carbon atoms.

2. A rechargeable aqueous metal-halogen cell as in claim 1, in which both electrode substrates are porous carbon.

3. A rechargeable aqueous metal-halogen cell as in claim 1, in which the separator is a microporous polyethylene or polypropylene separator.

4. A rechargeable aqueous metal-halogen cell as in claim 1, in which the organic halogen complexing additive is contained in the electrolytic solution of the positive compartment.

5. A rechargeble aqueous metal-halogen cell as in claim 1, in which the zinc salt is zinc bromide.

6. A rechargeable aqueous metal-halogen cell as in claim 1, in which both electrode substrates are porous carbon, the separator is a microporous polypropylene separator, the organic halogen complexing additive is contained in the electrolytic solution of the positive compartment, and the zinc salt is zinc bromide.

* * * * *